United States Patent
Hashimoto

(10) Patent No.: US 8,124,551 B2
(45) Date of Patent: Feb. 28, 2012

(54) GLASS MEMBER FOR OPTICAL PARTS AND GLASS COMPOSITION USED THEREFOR

(75) Inventor: Tomohiro Hashimoto, Kanagawa (JP)

(73) Assignee: Ohara Inc., Kanagawa (JP)

( * ) Notice: Subject to any disclaimer, the term of this patent is extended or adjusted under 35 U.S.C. 154(b) by 408 days.

(21) Appl. No.: 12/320,259

(22) Filed: Jan. 22, 2009

(65) Prior Publication Data

US 2009/0203513 A1 Aug. 13, 2009

(30) Foreign Application Priority Data

Feb. 8, 2008 (JP) ................................ 2008-029185
Oct. 2, 2008 (JP) ................................ 2008-257408

(51) Int. Cl.
*C03C 3/078* (2006.01)
*C03C 3/085* (2006.01)
*C03C 3/062* (2006.01)
*C03C 25/00* (2006.01)
*C03B 37/018* (2006.01)

(52) U.S. Cl. ................. 501/72; 501/69; 501/73; 65/392

(58) Field of Classification Search .................... 65/392; 385/123, 124; 501/65–72
See application file for complete search history.

(56) References Cited

U.S. PATENT DOCUMENTS

| | | | | |
|---|---|---|---|---|
| 6,709,998 B2 * | 3/2004 | Wolff et al. | ...................... | 501/73 |
| 6,853,785 B2 * | 2/2005 | Dunn et al. | .................... | 385/123 |
| 7,262,144 B2 * | 8/2007 | Schreder et al. | ................ | 501/66 |
| 7,295,731 B2 * | 11/2007 | Sezerman et al. | .............. | 385/48 |
| 2004/0071420 A1 * | 4/2004 | Sezerman et al. | ............. | 385/123 |
| 2006/0171033 A1 * | 8/2006 | Schreder et al. | .............. | 359/566 |
| 2007/0230861 A1 * | 10/2007 | Khrushchev et al. | ........... | 385/13 |

FOREIGN PATENT DOCUMENTS

| | | |
|---|---|---|
| JP | 09-311237 | 12/1997 |
| JP | 2005-321421 | 11/2005 |

OTHER PUBLICATIONS

Watanabe et al., "Transmission and photoluminescence images of three-dimensional memory in vitreous silica", Jun. 28, 1999, pp. 3957-3959, vol. 74, No. 26, American Institute of Physics.

* cited by examiner

*Primary Examiner* — Jerry Lorengo
*Assistant Examiner* — Noah Wiese
(74) *Attorney, Agent, or Firm* — Hoffman & Baron, LLP

(57) ABSTRACT

There is provided a glass member for optical parts that represents a greater absolute value $|\Delta n|$ of refractive index difference $\Delta n$ of visual light between base glass and heterogeneous phase region. In the glass member for optical parts, the heterogeneous phase region distinguishable by a different refractive index is formed at an intended location inside a glass by focused irradiation of a pulsed laser. When a multi-component optical glass of $SiO_2$, $Rn_2+RO$, and $TiO_2$ is used, $|\Delta n|$ of no less than 0.005 can be attained under a lower irradiation intensity. It is suitable for optical parts such as optical low-pass filters, diffractive optical parts, optical diffusion parts, optical filters, lenses and microlens arrays.

10 Claims, 7 Drawing Sheets

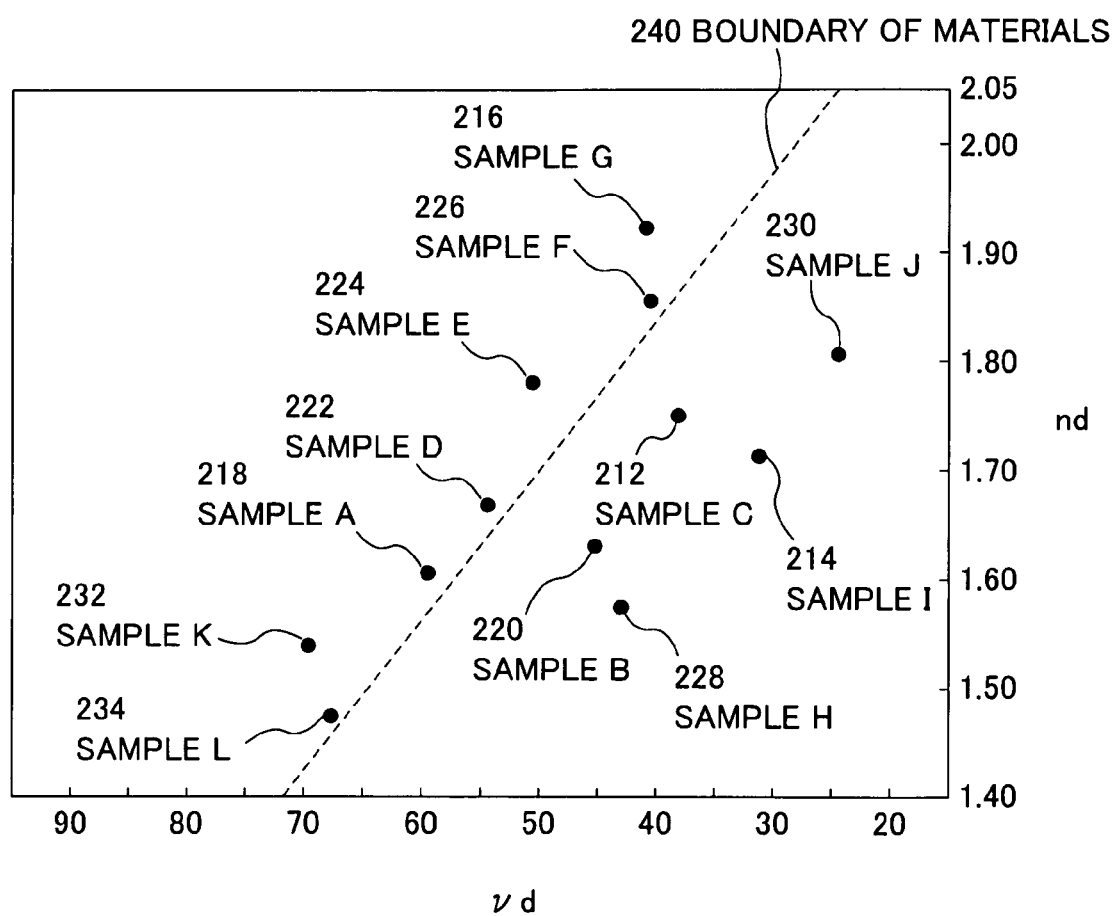

370 POINT LIGHT SOURCE AS INCIDENT LIGHT

380 OUTPUT POINT LIGHT SOURCE

GLASS MEMBER FOR OPTICAL PARTS AND GLASS COMPOSITION USED THEREFOR

CROSS REFERENCE TO RELATED APPLICATIONS

This application is based on and claims the benefit of priority from Japanese Patent Application Nos. 2008-029185 and 2008-257408, respectively filed on 8 Feb. 2008 and 2 Oct. 2008, the contents of which are incorporated herein by reference.

BACKGROUND OF THE INVENTION

1. Field of the Invention

The present invention relates to a glass member for optical parts, produced by use of a pulsed laser light, in particular an ultrashort pulsed laser light having a time period of no greater than $10^{-12}$ second such as a femtosecond ($10^{-15}$) pulse, and a glass composition used therefor.

2. Description of the Related Art

It is publicly known that ultrashort pulsed lasers in particular those laser lights having a pulse width on femtosecond level can realize a three-dimensional processing within transparent materials such as glass using a multiphoton absorption process on the basis of strong peak power thereof, and a method of constructing a stereoscopic light waveguide is disclosed in which a high refractive index region is formed inside a glass by focused irradiation of a laser light, as disclosed in Japanese Unexamined Patent Application, First Publication No. Hei 09-311237.

Furthermore, a light waveguide and a photonic crystal structure having a high refractive index area are proposed in which a fine crystal of a compound semiconductor is deposited to grow by irradiating an ultrashort pulsed laser inside a base glass where the compound semiconductor is dispersed in order to obtain a larger refractive index difference, as disclosed in Japanese Unexamined Patent Application, First Publication No. 2005-321421.

Furthermore, an optical part is proposed in which a cavity is formed inside a glass as a portion having a lowered refractive index and the difference between the refractive index of the cavity and the refractive index of non-laser irradiated portions is utilized as disclosed in M. Watanabe, S. Juodkazis, H-B. Sun, S. Matsuo, and H. Misawa, "Transmission and photoluminescence image of three-dimensional memory in vitreous silica", Applied Physics Lett, Vol. 74, No. 26, (1999) pp 3957-3959. For example, a three-dimensional photonic crystal structure is publicly known in which cavities are laminated like a face-centered cubic lattice structure inside a silica glass doped with 10% Ge.

SUMMARY OF THE INVENTION

However, glasses containing mainly a large amount of $SiO_2$ component such as silica glasses are utilized in the prior art described above. Such glasses contain no or less modifier oxide component to modify their refractive indices or dispersion properties, therefore, it is difficult to control necessary optical properties when used for optical parts and thus their applications are considerably limited. Furthermore, since very high temperatures are necessary in their production, their production costs become more expensive. In regards to glasses other than the silica glasses, there exists a method of depositing semiconductor fine particles with higher refractive indices within a glass in order to generate a larger refractive index difference, however, there also exists a task that components with a high environmental load such as cadmium, selenium and lead should be included into the base glass as a semiconductor component. When a cavity is utilized, a larger refractive index difference can be expected if the size of the cavity is of an order of wavelength size, however, it is very difficult to control the shape of the cavity.

It is also necessary for such glasses that the intensity of laser irradiation is assured to be no less than a certain level in order to generate the refractive index difference in optical parts by laser processing, thus cost reduction is limited in their production steps. There also is a problem that a laser with higher irradiation intensity leads to a higher possibility of unintended occurrences of defects such as physical cavities and fine cracks, thus lowering the yield in production processes.

Consequently, there has been a need for a glass composition from which a larger refractive index difference can be obtained even under lower irradiation intensity. In regards to multicomponent optical glasses publicly known as ordinary optical glasses at present, evaluation is insufficient with respect to focused irradiation conditions and measuring methods of refractive indices in a unified manner, and it has not been investigated which glass tends to generate a large refractive index difference under a certain focused irradiation condition. Furthermore, even when only a value of refractive index can be known, it is necessary for actual design of devices to know whether the refractive index is plus or minus based on a base material as well as distribution thereof.

Transmission-type optical devices are not significantly affected in use by plus or minus direction of the refractive index difference; however, design of optical parts and combination of parts can be performed with a higher degree of freedom by appropriately selecting a glass composition of which the value, sign and distribution of refractive index difference are known.

It is an object of the present invention to obtain a certain refractive index difference in optical parts using conventional multicomponent optical glasses for the base glass without including components having a high environmental load such as cadmium, selenium and lead. It is also an object of the present invention to provide a laser processing method and a combination of glass materials that can obtain a certain optical performance even when output power of focused irradiation is lowered during laser processing. Consequently, it is an object to reduce the cost of production steps of optical parts.

The present inventors have found a multicomponent glass material appropriately utilized for optical parts that control a transmitted light by use of a refractive index change region derived from a heterogeneous phase that is formed in two- or three-dimensions inside a glass by a pulsed laser light and also found physical-property requirements to obtain the multicomponent glass material having such properties, thereby achieving the present invention.

The present invention provides such means as follows.

In a first aspect of the present invention, a glass member for optical parts having a heterogeneous phase region therein that is distinguishable by a different refractive index is provided, wherein absolute value $|\Delta n|$ of refractive index difference $\Delta n$ of visual light is no less than 0.005 between base glass and the heterogeneous phase region in the glass member for optical parts (excluding the case where the heterogeneous phase is a cavity).

According to a second aspect, in the glass member for optical parts according to the first aspect, the heterogeneous phase region is formed by focused irradiation of a pulsed laser.

According to a third aspect, in the glass member for optical parts according to the first or second aspect, the glass member for optical parts contains: 25% to 75% of $SiO_2$, 1% to 50% of $Rn_2O+RO$ and 0.9% to 50% of $TiO_2$, as mass % based on oxides, where $Rn_2O$ is one or more selected from $Li_2O$, $Na_2O$, $K_2O$, $Rb_2O$ and $Cs_2O$, and RO is one or more selected from MgO, SrO, CaO, BaO and ZnO.

According to a fourth aspect, in the glass member for optical parts according to the third aspect, the glass member for optical parts contains 0% to 17% of $B_2O_3$ as mass % based on oxides.

According to a fifth aspect, in the glass member for optical parts according to the third or fourth aspect, the glass member for optical parts contains 0.9% to 65% of $BaO+TiO_2$ as mass % based on oxides.

According to a sixth aspect, in the glass member for optical parts according to any one of the first to fifth aspects, Abbe number ($v_d$) and refractive index ($n_d$) of the base glass are within a range to satisfy the formula (I).

$$n_d < 2.32 - 0.013 v_d \quad (I)$$

According to a seventh aspect, in the glass member for optical parts according to any one of the second to sixth aspects, the pulsed laser satisfies the following conditions (a) to (d):
(a) pulse width: 10 femtoseconds ($10 \times 10^{-15}$ second) to 10 picoseconds ($10 \times 10^{-12}$ second);
(b) repetition frequency: 10 Hz to 100 MHz;
(c) peak power density at focal point: 25 $GW/cm^2$ to 400 $TW/cm^2$; and
(d) focal point is movable by a scanning mechanism and scanning speed is 10 μm/sec to 10 mm/sec.

According to an eighth aspect, in the glass member for optical parts according to any one of the first to seventh aspects, the heterogeneous phase region inside the glass member for optical parts is periodically and/or randomly formed in two- or three-dimensions.

According to a ninth aspect, in the glass member for optical parts according to any one of the first to eighth aspects, the glass member for optical parts is used as an optical part selected from an optical low-pass filter, a diffractive optical part, a lens and a microlens array.

In a tenth aspect of the present invention, a method of producing the glass member for optical parts according to any one of the first to ninth aspects includes irradiating a laser beam, satisfying the following conditions (a) to (d), and forming a heterogeneous phase region distinguishable by a different refractive index at an intended location inside a glass:
(a) pulse width: 10 femtoseconds ($10 \times 10^{-15}$ second) to 10 picoseconds ($10 \times 10^{-12}$ second);
(b) repetition frequency: 10 Hz to 100 MHz;
(c) peak power density at focal point: 25 $GW/cm^2$ to 400 $TW/cm^2$; and
(d) focal point is movable by a scanning mechanism and scanning speed is 10 μm/sec to 10 mm/sec.

In an eleventh aspect of the present invention, a glass composition for producing an optical part, into which a heterogeneous phase region distinguishable by a different refractive index is formed at an intended location inside a glass by focused irradiation of a pulsed laser is provided, which contains 25% to 75% of $SiO_2$, 1% to 50% of $Rn_2O+RO$ and 0.9% to 50% of $TiO_2$, as mass % based on oxides, where $Rn_2O$ is one or more selected from $Li_2O$, $Na_2O$, $K_2O$, $Rb_2O$ and $Cs_2O$, and RO is one or more selected from MgO, SrO, CaO, BaO and ZnO.

In a twelve aspect of the present invention, a method of using a glass composition for optical parts is provided, which produces an optical part into which a heterogeneous phase region distinguishable by a different refractive index is formed at an intended location inside a glass by focused irradiation of a pulsed laser, in which the glass composition contains 25% to 75% of $SiO_2$, 1% to 50% of $Rn_2O+RO$ and 0.9% to 50% of $TiO_2$, as mass % based on oxides, where $Rn_2O$ is one or more selected from $Li_2O$, $Na_2O$, $K_2O$, $Rb_2O$ and $Cs_2O$, and RO is one or more selected from MgO, SrO, CaO, BaO and ZnO.

In accordance with the present invention, the absolute value |Δn| of refractive index difference Δn of visual light is as large as at least 0.005 between the base glass and the heterogeneous phase region, therefore, it is adequate for optical parts such as optical low-pass filters, diffractive optical parts, lenses and microlens arrays.

Furthermore, the preferable aspect leads to an effect that the base glass can generate an optical performance to have a certain refractive index difference without including components having a high environmental load such as cadmium, selenium and lead. Furthermore, since radiant exposure or power of laser for generating a refractive index difference necessary for optical parts may be decreased by selecting the composition of glass material, an effect is derived that cost can be electively reduced in production steps.

Furthermore, since the laser irradiation can be reduced per one site, an effect is derived that a plurality of sites inside a glass can be concurrently processed in the present invention by dividing a laser light, having a conventional irradiation output, into a plurality of paths. Furthermore, it can be estimated in advance which glass tends to generate a greater refractive index difference by providing a focused irradiation condition and a method of measuring refractive index with respect to multicomponent optical glasses.

Consequently, an effect can be derived that steps such as design, production and examination are shortened to reduce the cost for obtaining a certain optical performance using laser processing in the production of optical parts where downsizing has become more important. Furthermore, since optical parts to be machined such as ground aspheric lenses are unnecessary, an effect is derived that the number of steps and processing time can be reduced.

The present invention provides a higher degree of freedom in processing in production steps, therefore, an effect is derived that optical parts can be easily obtained even for those having a complicated pattern design which has been difficult for conventional technology, and production costs can be reduced due to a reduction in the number of processing steps and processing time.

In addition, since processed substrates can be processed after mounting on a front face of solid-state image pickup devices, an effect is derived that problem of mismatched mounting can be solved and process yield can be increased.

Accordingly, the invention can contribute to mounting accuracy in production processes, labor saving in production processes and increase of production throughput.

BRIEF DESCRIPTION OF THE DRAWINGS

FIG. 6 is a view that exemplarily shows a feature of properties of a base material in a method of forming a heterogeneous phase in accordance with one embodiment of the present invention;

DETAILED DESCRIPTION OF THE INVENTION

Figure 1:
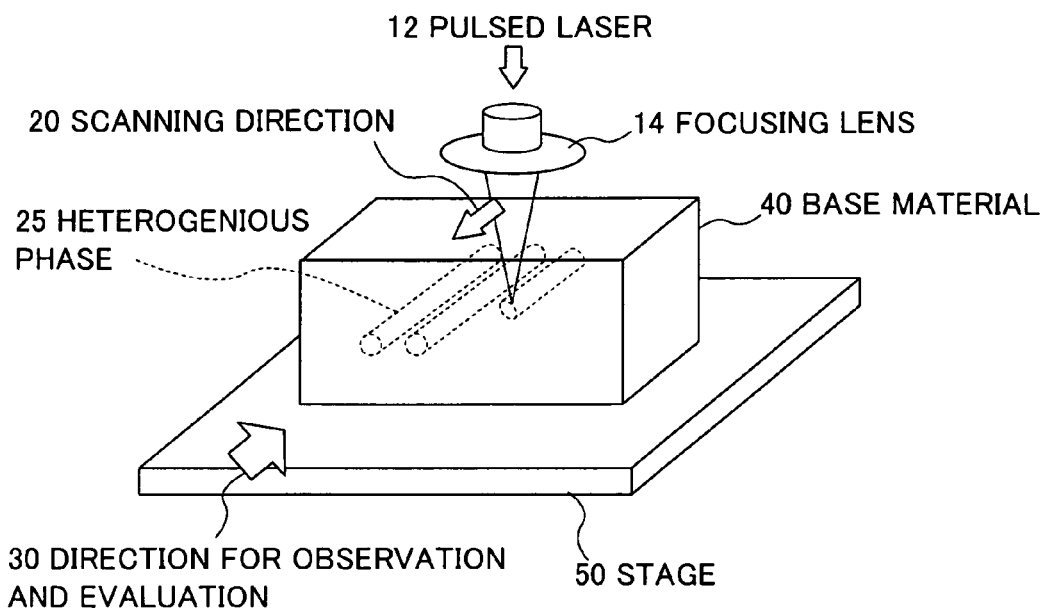
FIG. 1 is a view that exemplarily shows a method of forming a heterogeneous phase inside a glass in accordance with one embodiment of the present invention.

The present invention is explained in the following with respect to embodiments. In addition, the following is no more than an exemplification, to which the present invention is not limited in terms of technical scope. In addition, % means mass % unless indicated otherwise. Furthermore, $n_d$ indicates a refractive index at d-line (wavelength: 587.6 nm) and $v_d$ is an Abbe number.

[Glass Composition for Optical Parts]

The glass composition for optical parts (also referred to as merely "glass"), in which a heterogeneous phase having a large refractive index difference can be generated, is a so-called multicomponent optical glass and specifically contains $SiO_2$ and $TiO_2$ and also a substance(s) selected from B, Al, Ba, Li, Na, K, Ca, Sr, Zn, Zr, Nb, Sb, Rb, Cs, Mg and F or oxides thereof. Preferably, it contains $SiO_2$ and $TiO_2$ and also $B_2O_3$. Furthermore, it contains $SiO_2$ and $TiO_2$ and also BaO.

Although $SiO_2$ is a very useful component in glass components of the present invention, it is difficult to generate a large refractive index difference from only this component since the refractive index difference is likely to change toward a plus direction.

That is, $SiO_2$ is a component that forms a glass network in a glass, and large power should be input at laser irradiation in order to break its bond. However, when other components exist together therewith, $SiO_2$ is effective to increase the refractive index difference of the heterogeneous phase formed by laser irradiation. That is, it is believed that a component, which contributes less to form the glass network and represents a lower binding force, moves within the glass to cause a change of refractive index.

A lower limit of $SiO_2$ is preferably 25%, more preferably 30%, and most preferably 35%. A content of no less than 25% can lead to stable vitrification. Furthermore, the glass itself can also be stable when other modifier oxides are included that affect the refractive index of the glass itself or the refractive index difference of the heterogeneous phase formed by laser irradiation. The upper limit of $SiO_2$ is preferably 75%, more preferably 70%, and most preferably 65%. A content of no greater than 75% is preferable in that the glass can be fused at lower temperatures and uniform glass is likely to be obtained with less string and bubble.

$TiO_2$ is also a very useful component in glass components of the present invention and represents a most significant effect as a component to increase the refractive index difference depending on the combination with other modifier oxides and mixing ratio. It is effective in particular to increase the refractive index difference Δn toward a minus direction.

The lower limit of $TiO_2$ is preferably 0.9%, more preferably 1%, and most preferably 5%. A content of no less than 0.9% is preferable in that it is effective to increase the refractive index change of the heterogeneous phase toward a minus direction. The upper limit of $TiO_2$ is preferably 50%, more preferably 40%, and most preferably 30%. A content of no greater than 50% is preferable in that the influence of devitrification of the glass containing $SiO_2$ described above is lowered and the glass tends to be produced stably with high transparency at visible light region while reducing coloring due to valence change of Ti ion.

It is essential to contain at least one of $Li_2O$, $Na_2O$, $K_2O$, $Rb_2O$ and $Cs_2O$ of alkaline metal oxide ($Rn_2O$) and MgO, SrO, CaO, BaO and ZnO of divalent metal oxide (RO). One of these or combination of two or more can act to break the glass network of $SiO_2$ and enhance solubility during glass production thereby further stabilizing the glass. These components themselves are less likely to contribute to an increase or decrease in the refractive index difference but are believed to act to promote the movement of other components that have a large influence on the refractive index difference.

The lower limit of the total content of $Rn_2O$+RO is preferably 1%, more preferably 10%, and most preferably 20%. A content of no less than 1% is preferable in that the glass is more stable at lower temperatures. The upper limit of the total content is preferably 50%, more preferably 45%, and most preferably 40%. A content of no greater than 50% is preferable in that $TiO_2$ component having a large influence of the refractive index difference can be included in a larger content.

[Optional Component]

When $B_2O_3$ coexists with $SiO_2$, the fusion temperature can be lowered to obtain a stable glass. The upper limit of $B_2O_3$ is preferably 17%, more preferably 10%, and most preferably 5%. A content of no greater than 17% is preferable in that phase separation of glass is unlikely to occur, stable glass is easily obtainable and $TiO_2$ can be included in a larger content.

When BaO coexists with $TiO_2$, the refractive index distribution is likely to increase at the heterogeneous phase and also the tendency is stronger compared to those of other components such as $RnO_2$ or RO. The lower limit of the total content of BaO+$TiO_2$ is preferably 0.9%, more preferably 10%, and most preferably 20%. A content of no less than 0.9% is preferable in that the effect of $TiO_2$ to increase the refractive index difference is easily obtainable. The upper limit of the total content is preferably 65%, more preferably 60%, and most preferably 50%. A content of no greater than 65% is preferable in that devitrification is unlikely to occur and stable glass is easily obtainable even when $TiO_2$ is included in larger amounts.

$Al_2O_3$ can bring about a stable glass by coexisting with $SiO_2$. The upper limit of $Al_2O_3$ is preferably 4%. $Nb_2O_5$ can raise the refractive index of glass itself. The upper limit of $Nb_2O_5$ is preferably 20%. Furthermore, $ZrO_2$ can improve fire-resistive performance and act to suppress devitrification by being adding during glass production. The upper limit of $ZrO_2$ is preferably 6%. $Sb_2O_3$, which is not an essential component, can be used as a defoaming agent during glass production. The upper limit of $Sb_2O_3$ is preferably 0.4%. Fluorine, which is not an essential component, has an effect to lower the refractive index and dispersion of the glass itself and an effect to decrease the refractive index difference produced by laser irradiation.

Therefore, it is preferably included in a content of no greater than 5% for the purpose of adjusting the refractive index and dispersion of the glass itself. Further, at least one component from the group of $Y_2O_3$, SnO, $Bi_2O_3$ and $TeO_2$ may be included. The upper limit of these components is preferably 15%.

[Components not Included]

In addition, oxides that contain at least one component from the group of $WO_3$, $Ta_2O_5$, $La_2O_3$ and $Gd_2O_3$ and elements in the oxides are not preferable since environmental load and biological toxicity etc. are reported.

Furthermore, it is preferred that transition metal components such as V, Cr, Mn, Fe, Co, Ni, Cu, Ag and Mo are not substantially contained when the optical part of the present invention is used at a visual wavelength region since the material itself is colored and absorption occurs at a specific wavelength in the visual range even when a small amount of each component or in combination is included.

Furthermore, it is preferred that rare earth components are not substantially contained when the optical part of the present invention is used at a visual wavelength region since inclusion of each component or in combination thereof may result in coloring and tend to cause absorption at a specific wavelength in the visual range.

Moreover, it is preferred that components such as Be, Pb, Th, Cd, Tl, As, Os, S, Se, Br, Cl and I are not substantially contained when environmental influence is important since these components are recently prone to be avoided for use as harmful chemical substances and their environmental countermeasures are necessary not only for production steps of glass but also for processing steps until disposal after production.

[Refractive Index Difference of Heterogeneous Phase Obtained in the Present Invention]

When an optical part is produced utilizing the heterogeneous phase having a refractive index different from that of the base material, the necessary thickness of the heterogeneous phase region existing inside the glass is determined depending on the refractive index difference Δn between the base material and the heterogeneous phase.

In general, in optical design of diffractive-optical elements etc, phase wave surface of a light passing through a part is calculated from 0 to $2\pi$ and the value of phase $\Phi$ is calculated by the formula (1) below, $$\frac{\Phi}{2\pi} = \frac{\Delta n d}{\lambda} \quad (1)$$

wherein $\Phi$ is a phase (in radian), $\Delta n$ is the refractive index difference between the base material and the heterogeneous phase; d is the thickness of the heterogeneous phase, and $\lambda$ is the wavelength.

In the formula (1), the thickness necessary to be $\Phi=2\pi$ is shown at a design wavelength of $\lambda=0.632$ μm in Table 1. That is, the larger the refractive index difference Δn, the necessary thickness of the heterogeneous phase region inside the glass is reduced in order to obtain the same effect (e.g., phase change).

TABLE 1

| Δn | Thickness d [μm] |
|---|---|
| 0.001 | 632.8 |
| 0.002 | 316.4 |
| 0.003 | 210.9 |
| 0.004 | 158.2 |
| 0.005 | 126.6 |
| 0.01 | 63.3 |
| 0.02 | 31.6 |

The smaller thickness of the required heterogeneous phase region is effective to compact the optical parts that utilize the heterogeneous phase with a refractive index different from that of the base material.

Furthermore, the total amount of the heterogeneous phase region to be formed is reduced, thus the required energy is also reduced.

Furthermore, the thinner is the thickness of the heterogeneous phase region, the larger the portion in the glass that is available for processing, which is preferred for processing and producing ability, for example, in the case where products having a heterogeneous phase region formed inside glass are previously produced and are utilized as required.

There currently exists a very great need in terms of compactifying optical parts mounted on devices, for example, optical low-pass filters used in digital cameras, having a thickness of about 100 to 300 μm are currently in development. On the other hand, when optical parts are produced that utilize the heterogeneous phase with a refractive index different from that of the base material, it is generally said that the thickness of the heterogeneous phase region is preferably less than about half of the thickness of the processed glass in order to enhance the degree of freedom to design diffractive optical parts. If the glass thickness is 300 μm, the thickness is preferably less than 150 μm of about half of the glass. It is therefore preferred that the refractive index difference between the base material and the heterogeneous phase region is no less than 0.005.

[Generating Means and Transmitting Means of Pulsed Laser Light]

In the present invention, a pulsed laser is usable that has a pulse width of no greater than one picosecond ($10^{-12}$ sec) and is unlikely to generate heat at the focal point. Preferably, a femtosecond pulsed laser may be used for the pulsed laser light that has a wavelength of about 800 nm, a pulse width of 300 fs ($3 \times 10^{-13}$ sec), a repetition frequency of 250 kHz and an average input power of 120 to 480 mW (0.48 to 1.25 μJ/pulse) in front of the focusing objective lens. A heterogeneous phase can be formed instantaneously at a local point inside a glass material by focused irradiation of the laser inside a surface-ground glass material through an objective lens etc. of magnification ratio 10 times (numeric aperture 0.3).

The wavelength of the irradiating laser is preferably within a wavelength region that is non-absorptive and transparent for the glass of the present invention. It is preferably about 200 nm to 2100 nm, more preferably 400 to 1100 nm, and most preferably 500 to 900 nm, although depending on transmittance of the irradiated glass and existence or nonexistence of absorption at a specific wavelength. The range is preferable in that precise processing can be achieved since multiphoton absorption occurs only at the sites of greater light intensity near the focal point.

The lower limit of the repetition frequency is preferably no less than 10 Hz, more preferably no less than 1 kHz, and most preferably no less than 100 kHz. The lower limit of the repetition frequency of no less than 10 Hz may average and reduce the influence of the fluctuation of intensity and pointing of the laser beam in forming the heterogeneous phase, since a laser pulse of at least one pulse is irradiated to each site to be focused. It is also preferable in that the heterogeneous phase is easily formed with a smoother interface, a smooth surface is easily maintained even at higher scanning speed and the throughput can be increased still more.

The upper limit of the repetition frequency is preferably no greater than 100 MHz, more preferably no greater than 1 MHz, and most preferably no greater than 500 kHz. The upper limit of the repetition frequency of no greater than 100 MHz is preferable in that thermal distortion and cracks due to heat accumulation can be suppressed during processing, stage speed is easily controlled and more precise processing can be carried out.

The lower limit of the pulse width is preferably no less than 10 fs, more preferably no less than 50 fs, and most preferably no less than 100 fs. The lower limit of no less than 10 fs is preferable in that the size of the formed heterogeneous phase and distribution of the refractive index change are easily adjusted.

The upper limit of the pulse width is preferably no greater than 1 ps, more preferably no greater than 500 fs, and most preferably no greater than 400 fs. The upper limit of no greater than 1 ps is preferable in that thermal influence is reduced on peripheral portions of the formed heterogeneous phase and highly precise processing can be carried out.

Preferably, an electric or air bearing stage with a position repeatability of no greater than 100 nm is used as a stage, and the scanning speed is preferably 10 µm/sec to 10 mm/sec. The range can lead to stable processing even of superimposed drawing.

The numeric aperture (N.A.) of the focusing lens is expressed by the following formula.

$$N.A. = \frac{f}{2\Phi} \quad (2)$$

wherein, f is a focal length of the lens and Φ is an effective aperture diameter of the lens.

The lower limit of the numeric aperture is preferably no less than 0.01, more preferably no less than 0.05, and most preferably no less than 0.1. The lower limit of the numeric aperture of no less than 0.01 is preferable in that the refractive index change easily occurs inside the glass and also the internal region of glasses with thinner thicknesses can be processed even under a higher power without destroying incident and output faces.

The upper limit of the numeric aperture is preferably no greater than 0.85, more preferably no greater than 0.6, and most preferably no greater than 0.5. The upper limit of the numeric aperture of no greater than 0.85 leads to a processing with a relatively small numeric aperture and results in that the refractive index change easily occurs without cavity inside the glass even under an increased power density and the heterogeneous phase is easily formed with a larger refractive index difference at a relatively large volume inside the glass.

The lower limit of focusing magnification is preferably no less than one times (equivalent), more preferably no less than 5 times, and most preferably no less than 10 times. The lower limit of focusing magnification of no less than one times is preferable in that a large refractive index change is easily obtained and the shape of the heterogeneous phase is easily controlled in the light axis direction.

On the other hand, the upper limit of the focusing magnification is preferably no greater than 60 times, no greater than 40 times, and no greater than 20 times. The upper limit of the focusing magnification of no greater than 60 times is preferable in that a large refractive index change easily occurs even under a relatively low power, a large distance can be set between a sample and the objective lens and selective range of processable surface shape comes to broad.

In the method of processing an optical glass member according to the present invention, power density of the pulsed laser beam in use becomes important since the heterogeneous phase is formed inside a material by irradiating a pulsed laser beam. The power density of the laser beam usually indicates an amount of energy input per area and per time and is expressed by the following formula when a continuous-wave laser beam is focused into one point.

$$\text{Power Density (W/cm}^2\text{)=Average Power (W)/Focused Area (cm}^2\text{)} \quad (3)$$

Compared to this, it is expressed by the following formula when a pulsed laser beam is focused into one point.

$$\text{Peak Power Density (W/cm}^2\text{)=Energy per Pulse (J)/Pulse Width (sec)/Focused Area (cm}^2\text{)} \quad (4)$$

The lower limit of the peak power density of the focused pulsed laser is no less than 25 GW/cm$^2$, more preferably no less than 1 TW/cm$^2$, and most preferably no less than 3 TW/cm$^2$ at the focal point, the focused position, or the site with the highest energy within image locations (G: giga=$10^9$, T: tera=$10^{12}$). The lower limit of the peak power of no less than 25 GW/cm$^2$ is preferable in that the refractive index change can generate inside the glass.

On the other hand, the upper limit is preferably no greater than 400 TW/cm$^2$, more preferably no greater than 200 TW/cm$^2$, and most preferably no greater than 100 TW/cm$^2$.

The upper limit of the peak power of no greater than 400 TW/cm$^2$ is preferable in that the shape of the refractive index change region is easily controlled and also the refractive index distribution of the refractive index change region can be made relatively uniform.

On the other hand, the irradiated glass has preferably no absorption for the irradiating laser wavelength and internal transmittance is preferably no less than 95% measured for 10 cm thick at the irradiating laser wavelength.

The irradiating conditions can be appropriately set and preferably the following conditions (a) to (d) are satisfied. A refractive index of no less than 0.005 is obtainable under lower irradiation intensity in the present invention by way of combining the glass composition described above and the irradiating conditions, (a) pulse width: 10 femtoseconds ($10\times10^{-15}$ second) to 10 picoseconds ($10\times10^{-12}$ second);
(b) repetition frequency: 10 Hz to 100 MHz;
(c) peak power density at focal point: 25 GW/cm$^2$ to 400 TW/cm$^2$; and
(d) focal point is movable by a scanning mechanism and scanning speed is 10 µm/sec to 10 mm/sec.

In the present invention, the refractive index change region of the heterogeneous phase is continuous. That is, generation of a cavity inside the glass material is excluded.

Preferably, valence change of rare earth elements, deposition of metal colloid and the resulting coloring glass of optical parts, and crystal deposition and the resulting generation of anisotropy are excluded in the method of forming a heterogeneous phase according to the present invention. It is also preferred that the periodic pitch and/or width of the heterogeneous phase is no less than about the wavelength size used for optical parts in the periodic structure of the heterogeneous phase in the present invention. That is, specifically, it is preferably no less than 400 nm, more preferably no less than 1 μm, and most preferably no less than 10 μm, in case of optical parts utilized within a visual light range.

The periodic pitch of the periodic configuration and/or width of the heterogeneous phase of no less than 400 nm increases the degree of freedom to control the shape of heterogeneous phase at processing and is preferable to control the light phase transmitting the optical parts. It is therefore preferable from the reason described above that the optical parts are distinguished from those that utilize a configuration having a periodic pitch of no greater than about the wavelength.

The production method of the present invention may have a step to divide the pulsed laser light into plural lights and can form collectively plural regions with different refractive indices inside the material by focus-irradiating the plural pulsed laser lights respectively at plural positions thereby the processing throughput can be increased. The step to divide the beam into plural ones can be carried out using optical parts such as beam splitters, diffraction gratings, microlens arrays, holograms and phase modulation elements, but is not limited thereto.

The production method may also have a step to modify one or more of phase, amplitude, wavelength, polarization, and width of pulse period of each of one or plural divided pulsed laser lights, and processing can be carried out with a higher degree of freedom without depending on refractive index, dispersion of refractive index, and shape of irradiated material by appropriately combining the modified pulsed laser lights.

Furthermore, the focused points of the focused pulsed laser lights can be shifted relative to the material, in order to form still widely the refractive index change regions that are formed collectively at intended positions inside the glass for optical parts as described above.

[Method of Forming Heterogeneous Phase]

FIG. 1 is a view that exemplarily shows a method of forming the heterogeneous phase inside the glass in accordance with one embodiment of the present invention. A base material 40 is fixed to a stage 50 movable in a horizontal plane, a pulsed laser 12 is oscillated while moving the stage 50, and a laser light is irradiated from above the base material 40. The laser light from the pulsed laser 12 is focused by a focusing lens 14 to heat instantaneously a local area near the focal point inside the base material 40. Consequently, a heterogeneous phase 25, of which the refractive index has been changed, is formed inside the base material 40. The heterogeneous phase 25 can be formed with an approximate linear shape inside the base material 40 by appropriately setting a scanning direction 20. The heterogeneous phase 25 can be evaluated for the refractive index using a cross section viewed from a direction 30 of observation and evaluation.

In addition, when the glass, processed using the method of forming a heterogeneous phase according to the present invention, is used for optical parts etc., the transmitted light is usually set to be parallel with the laser light from the pulsed laser 12. That is, the direction 30 of observation and evaluation is perpendicular to the direction of the transmitted light of the cases where usually used as optical parts etc.

[Method of Evaluating Refractive Index of Heterogeneous Phase]

Figure 2:
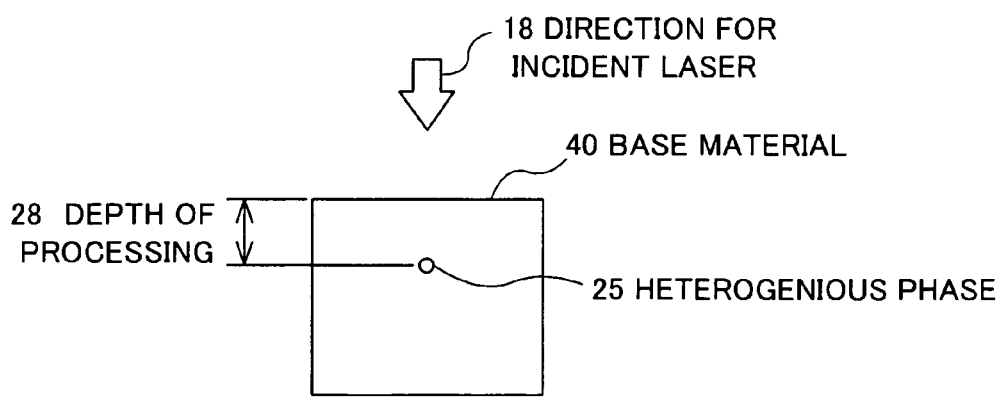
FIG. 2 is a view that shows a condition to observe a heterogeneous phase formed inside a glass and to evaluate refractive index in accordance with one embodiment of the present invention.

FIG. 2 is a view that shows a condition to observe the heterogeneous phase formed inside a glass and to evaluate the refractive index in accordance with one embodiment of the present invention. FIG. 2 exemplarily shows a cross section of the base material 40 that is cut perpendicularly to the direction 30 of observation and evaluation in FIG. 1.

The laser incident direction 18 is the same as the irradiating direction of the pulsed laser 12 in FIG. 1. The processing depth 28 is the distance from an edge face of the base material 40 near to the laser incident direction 18 to the heterogeneous phase 25. The depth 28 of processing is typically 10 to 2000 μm, but is not limited thereto, and can be appropriately set depending on the selection of focal length of the focusing lens 14 and the adjustment of span between the focusing lens 14 and the base material 40.

Figure 3:
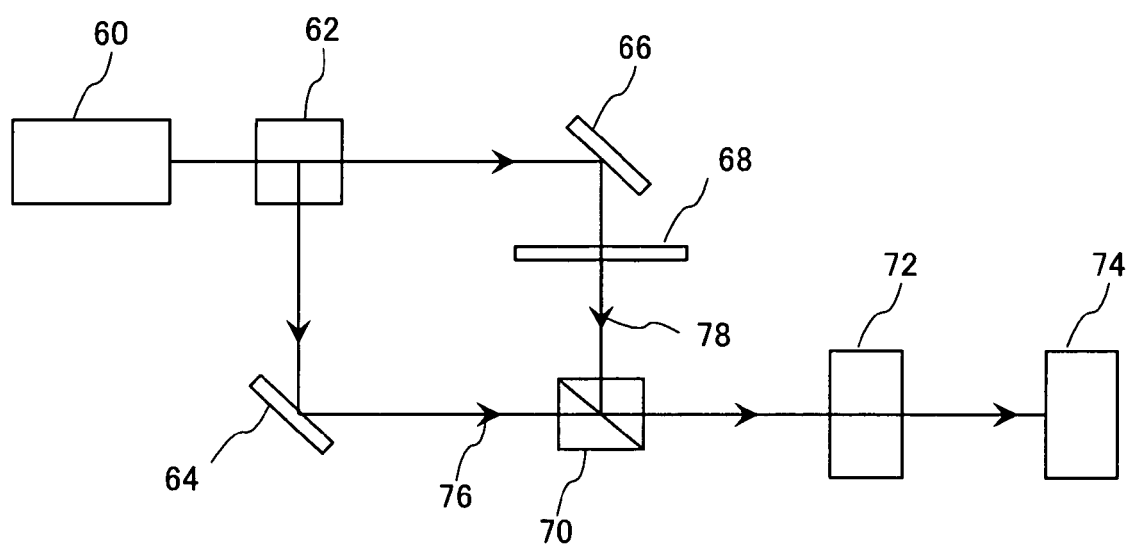
FIG. 3 is a view that shows a construction of a quantitative phase microscope to evaluate refractive index of a heterogeneous phase in accordance with one embodiment of the present invention.

FIG. 3 is a view that shows a construction of a quantitative phase microscope to evaluate the refractive index of a heterogeneous phase in accordance with one embodiment of the present invention. The quantitative phase microscope 55 has a light source 60, a splitter 62, mirrors 64, 66, a half mirror 70, a focusing optical system 72 and an image sensor 74. The light source 60 is preferably a laser. Alignment of the optical system is adjusted so that an object light 78 transmitted through a sample 68 and a reference light 76 cause a phase interference at the half mirror 70. The optical system, possible to be interposed on the path of the object light 78 and the reference light 76, can be appropriately designed.

Particularly, it is preferred that evaluation is carried out based on a lateral resolution of an approximate wavelength used for measurement by way of interposing an objective lens to enlarge the object light 78 transmitted through a sample 68 and an objective lens to dissipate the reference light 76.

The sample 68, obtained by polishing the cut base material, is 20 μm thick in the direction 30 of observation and evaluation. The sample 68 is placed so that the path of the object light 78 in the quantitative phase microscope passes through the measuring area of refractive index in the sample. That is, the path of the object light 78 is perpendicular to the cross section of the base material 40 containing the heterogeneous phase 25 shown in FIG. 2.

When the path of the object light 78 runs through the base material 40 containing no heterogeneous phase 25, phase information of the object light 78 is reflected by the refractive index of only the base material 40. When the path of the object light 78 runs through the heterogeneous phase 25, phase information of the object light 78 is reflected by the refractive index of the heterogeneous phase 25.

The refractive index difference etc. on the basis of the refractive index of the sample 68 and nonuniformity of material quality, which the sample 68 has, can be analyzed by way of measuring and analyzing the light, which has caused a phase interference described above, using the image sensor 74.

Measurement can be carried out for one- or two-dimensional distribution of the refractive index or the refractive index difference in the cross section of the sample 68. A preferable example of the quantitative phase microscope is a Mach-Zehnder microinterferometer. Accuracy of the measurable refractive index difference is typically 0.0002 at a wavelength of 632.8 nm. The refractive index difference between the base material 40 and the heterogeneous phase 25 can be measured by way of analyzing the object light 78 passing through the base material 40 and the heterogeneous phase 25 contained in the base material 40 using the quantitative phase microscope shown in FIG. 3.

[Optical Part]

The glass member for optical parts of the present invention can be used, depending on shape and pitch of the heterogeneous phase in the member, for transmission gratings, Fresnel lenses, hologram elements, diffractive lenses, camera lenses, lenses with spherical or color aberration correction, CD/DVD pickup lenses, microlenses, microlens arrays, etc.

For example, it can be installed into an imaging optical system with a solid-state image sensor as a diffractive optical part or light diffusion part and used for an optical low-pass filter that reduces a moire by appropriately smudging images. The use as a light diffusion element includes that of light diffusion plates etc. Use as an optical filter may be those for beam splitters, polarization filters, wavelength selective filters, wavelength low-pass filters, wavelength high-pass filters, optical attenuators (light faders), etc.

In regards to use as a lens, a part or entire of the optical member itself may be lens-shape, plane, sphere, aspheric surface, or adjustable surface; or the optical part may be combined with respect to the function due to the shape of member and the function of the heterogeneous phase therein.

In regards to other uses, it can also be used for recording memory parts, image display parts, etc. Furthermore, it may have a configuration of light waveguides, optical branching filters, or ring resonators. Application thereof is not limited thereto. It may be formed into an optical part with integrating the heterogeneous phases having these optical functions.

The optical part of the present invention makes use of the refractive index change region inside the material formed by focused irradiation of a pulsed laser light, thus the material shape at focused irradiation of the laser light is preferably flat at the laser incident surface, but is not necessarily limited to flat, and may have a convexo or concave curved surface or a high order curved surface such as lenses.

The optical part of the present invention may be those processed inside the material by focused irradiation of a laser light and then, for example, processed by cutting and polishing into an intended material shape, for example, the shape may be a convexo or concave curved surface or a high order curved surface or of a configuration having a polygonal bump or groove.

EXAMPLES

The present invention is explained more specifically with reference to examples in the following.

Example 1

Optical Property of Base Glass

Table 2 shows compositions of Samples A to L, provided as base materials, as for typical components (converted into oxide, mass %) The mark "-" in Table 2 indicates no existence in the composition or the compositional ratio is under the measurable limit.

Table 3 also shows the properties of Samples A to L.

The internal transmittances, measured for 10 cm thick, of Samples A to L were in a range of 99.5% to 99.9% at an irradiating laser wavelength of 800 nm. Furthermore, the internal transmittances at 400 nm were 82% to 99.9%, and the glasses were shown to have a high transmittance in visual light range with no specific absorption in a range from 400 nm to 800 nm.

TABLE 2

| | Composition [%] | | | | | | $Rn_2O + RO$ | $BaO + TiO_2$ |
| | $SiO_2$ | $B_2O_3$ | $Al_2O_3$ | $BaO$ | $TiO_2$ | $La_2O_3$ | Total | Total |
|---|---|---|---|---|---|---|---|---|
| Sample A | 44.1 | 21.3 | 2.0 | — | — | — | 28.4 | 0.05 |
| Sample B | 39.0 | 7.5 | 3.1 | 22.3 | 7.6 | — | 37.5 | 29.9 |
| Sample C | 25.3 | 9.6 | 3.4 | 32.0 | 11.6 | — | 38.0 | 43.6 |
| Sample D | 24.6 | 17.4 | 0.8 | 49.2 | 0.9 | 5.0 | 49.8 | 50.0 |
| Sample E | 2.0 | 32.6 | — | — | — | 34.9 | | |
| Sample F | 6.0 | 19.7 | — | — | — | 33.9 | 1.0 | |
| Sample G | 6.4 | 12.0 | — | — | — | 40.0 | | |
| Sample H | 65.0 | — | — | — | 13.8 | — | 20.1 | 13.8 |
| Sample I | 46.6 | — | — | 9.8 | 24.4 | — | 25.0 | 34.2 |
| Sample J | 27.5 | — | — | 13.8 | 28.9 | — | 30.0 | 42.7 |
| Sample K | 60.1 | 13.0 | 0.5 | — | — | — | 18.1 | |
| Sample L | 100 | — | — | — | — | — | | |

TABLE 3

| | Physical Properties | | |
| | Refractive Index ($n_d$) | Abbe Number ($v_d$) | Specific Gravity |
|---|---|---|---|
| Sample A | 1.58913 | 61.2 | 2.82 |
| Sample B | 1.63930 | 44.9 | 3.67 |
| Sample C | 1.72343 | 38.0 | 3.67 |
| Sample D | 1.65100 | 56.2 | 3.82 |
| Sample E | 1.75500 | 52.3 | 4.40 |
| Sample F | 1.80610 | 40.4 | 4.53 |
| Sample G | 1.88300 | 40.8 | 5.52 |
| Sample H | 1.56732 | 42.8 | 2.57 |
| Sample I | 1.68893 | 31.1 | 2.98 |
| Sample J | 1.80518 | 25.4 | 3.37 |
| Sample K | 1.48749 | 70.2 | 2.46 |
| Sample L | 1.458 | 67.7 | |

Example 2

Generation and Evaluation of Heterogeneous Phase

Generation of the heterogeneous phase was performed by the processes described above with reference to FIG. 1. That is, a laser was focused to a spot area of about $7.3 \times 10^{-8}$ cm$^2$ using a 10 times objective lens (UplanF1, manufactured by Olympus Co.) with a numeric aperture of 0.3 as the focusing lens 14. The stage 50 was moved in one direction at a speed of 1 mm per second. Scanning was repeated so that the focused area of the laser light comes to a line array shape with a clearance of 30 μm.

The femtosecond pulsed laser introduced a pulsed laser, which was oscillated at a center wavelength of 800 nm, a pulse width of 300 fs and a repetition frequency of 250 kHz from a Ti sapphire regenerative amplifying system (Mira 900 Reg-A9000 system, manufactured by Coherent Inc.) of Nd-YLF excitation, into the focusing lens.

The input laser power was adjusted by an ND filter, and the input power of 120 to 240 mW was put into as a time average output of the laser light measured in front of the objective lens. As a result of these procedures, a line array-shape heterogeneous phase 25 with a clearance of 30 μm was formed at the area of 200 μm from the upper edge face of the base material 40.

Moreover, a heterogeneous phase 25, aligned into plural parallel lines, was formed by appropriately adjusting the moving direction and the distance of the stage 50.

Table 4 shows the refractive index difference, as a difference from the base material, of the heterogeneous phase of Samples A to L that were processed by the method of forming the heterogeneous phase according to the present invention. The difference shows a signed-value of difference where the absolute value is maximum.

Figure 4:
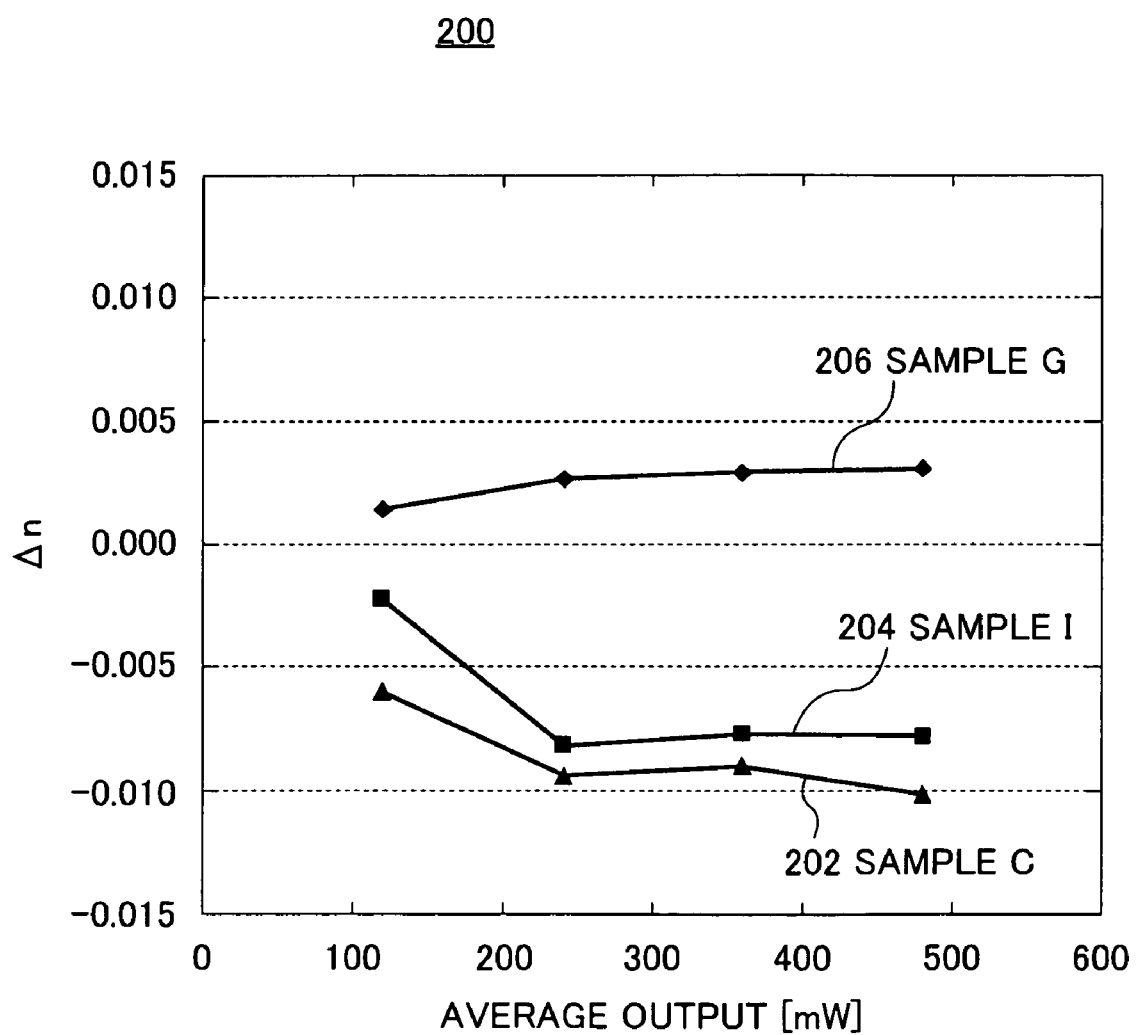
FIG. 4 is a graph that exemplarily shows how to measure a refractive index difference at a heterogeneous phase in a base material in accordance with one embodiment of the present invention.

FIG. 4 is a view that exemplarily shows how to measure the refractive index difference at the heterogeneous phase in the base material in accordance with one embodiment of the present invention.

Samples C, G and I were extracted in FIG. 4 in view of the measurement results of the refractive index difference of the heterogeneous phase shown in Table 4. Dependency 200 on the laser average output of the refractive index difference represents a refractive index difference of the heterogeneous phase from the base material, which is measured for the sample of the base material containing the heterogeneous phase using the quantitative phase microscope, versus the average output [mW] of time average of laser light output. Here, the average output is a laser power in front of the objective lens; when irradiated using a 10 times objective lens with a numeric aperture of 0.3, the energy per pulse and the peak power density at the focal point were respectively about 0.3, 0.6, 0.9 and 1.3 μJ/pulse and about 14, 28, 43 and 57 TW/cm$^2$, when the average output was 120, 240, 360 and 480 mW.

TABLE 4

| | Sign | 120 | 240 | 360 | 480 |
|---|---|---|---|---|---|
| Sample A | +Δn | 0.002 | 0.001 | 0.001 | 0.002 |
| | −Δn | −0.002 | −0.002 | −0.002 | −0.001 |
| Sample B | +Δn | 0.001 | 0.002 | 0.002 | 0.002 |
| | −Δn | −0.004 | −0.006 | −0.006 | −0.005 |
| Sample C | +Δn | 0.004 | 0.004 | 0.004 | 0.004 |
| | −Δn | −0.006 | −0.009 | −0.009 | −0.010 |
| Sample D | +Δn | 0.002 | 0.002 | 0.002 | (not |
| | −Δn | −0.004 | −0.004 | −0.004 | (not |
| Sample E | +Δn | 0.002 | 0.004 | 0.004 | 0.004 |
| | −Δn | −0.001 | −0.001 | −0.001 | −0.001 |
| Sample F | +Δn | 0.003 | 0.003 | 0.002 | 0.002 |
| | −Δn | −0.001 | −0.001 | −0.001 | −0.001 |
| Sample G | +Δn | 0.001 | 0.003 | 0.003 | 0.003 |
| | −Δn | −0.002 | −0.002 | −0.002 | −0.002 |
| Sample H | +Δn | 0.001 | 0.002 | 0.002 | 0.002 |
| | −Δn | −0.004 | −0.008 | −0.007 | −0.007 |
| Sample I | +Δn | 0.001 | 0.002 | 0.002 | 0.003 |
| | −Δn | −0.002 | −0.008 | −0.008 | −0.008 |
| Sample J | +Δn | 0.002 | 0.002 | 0.002 | (not |
| | −Δn | −0.005 | −0.006 | −0.006 | (not |
| Sample K | +Δn | 0.001 | 0.001 | 0.001 | 0.001 |
| | −Δn | −0.004 | −0.004 | −0.003 | −0.003 |
| Sample L | +Δn | 0.001 | 0.002 | 0.002 | 0.002 |
| | −Δn | −0.001 | −0.001 | −0.001 | −0.001 |

In FIG. 4, Sample C (202) and Sample I (204) represented a refractive index difference of no less than 0.005 as the absolute value under the irradiation condition of laser average output of 240 mW; however, the absolute value of the refractive index difference did not exceed 0.005 under entire irradiation conditions of laser average output of no greater than 480 mW for Sample G (206). That is, the upper limit of the refractive index difference of the heterogeneous phase depends on the composition of the base material.

As shown in Table 4, Samples B, C, D, H, I and J can generate the heterogeneous phase with the absolute value of no less than 0.005 of the refractive index difference based on the base material. Furthermore, Table 4 and FIG. 4 represent a feature that samples with above 0.005 of the absolute value Δn tend to have Δn of a larger value in minus direction.

In this regard, Sample D contains a rare earth element of La (lanthanum) that possibly causes nephropathy etc. in animals such as rats due to long-range accumulation.

Therefore, Sample D is an undesirable material in the present invention.

Accordingly, the heterogeneous phase with no less than 0.005 of absolute value of the refractive index difference based on the base material can be formed by carrying out the present invention on the materials of Samples B, C, H, I and J except for Sample D.

Furthermore, Samples B, D, H and J represented no less than 0.005 of absolute value of the refractive index difference even under a minimum laser average output of 120 mW in forming the heterogeneous phase having the refractive index difference shown in Table 2. That is, it can be said that the heterogeneous phase having an absolute value of no less than 0.005 of the refractive index difference at respective sites can be formed by dividing the path of laser light using appropriately a splitter etc. and processing simultaneously plural sites of an identical base material using the divided laser lights by use of Samples B, D, H and J as the base material. Without being limited thereto, means to divide the laser light, dividing number and average output can be appropriately designed.

Example 3

Cross-Sectional Shape of Heterogeneous Phase

FIG. 5 is a view that exemplarily shows a cross-sectional shape of the heterogeneous phase in the base material that is formed using the method of forming the heterogeneous phase in accordance with one embodiment of the present invention.

From a certain laser incident direction 18, a femtosecond pulsed laser light, focused by a 10 times focusing lens, was irradiated at a repetition frequency of 250 kHz, a center wavelength of 800 nm, and a pulse width of 260 fs using Sample C in Tables 1 to 3 as the base material. The laser average output was 120, 240, 360 and 480 mW respectively in FIGS. 5A to 5D.

A 60 times oil immersion lens was used in an objective optical system for measuring the refractive index difference, and the phase change was measured at a wavelength of 632.8 nm for a sample of 20 μm thick in a range from the laser-incident edge face to 97.8 μm deep of the base material. The boundary of the heterogeneous phase 25 in FIG. 5 indicates that the refractive index difference from the base material is no less than 0.005.

It has become clear from the cross-sectional shapes of the heterogeneous phase shown in FIGS. 5A to 5D that the boundary of the heterogeneous phase 25 extends over a wider range as the laser average output increases. That is, the area of the heterogeneous phase having the refractive index difference of no less than 0.005 can be controlled by the irradiation output of laser light in the method of forming the heterogeneous phase in the present invention.

Figure 5A:
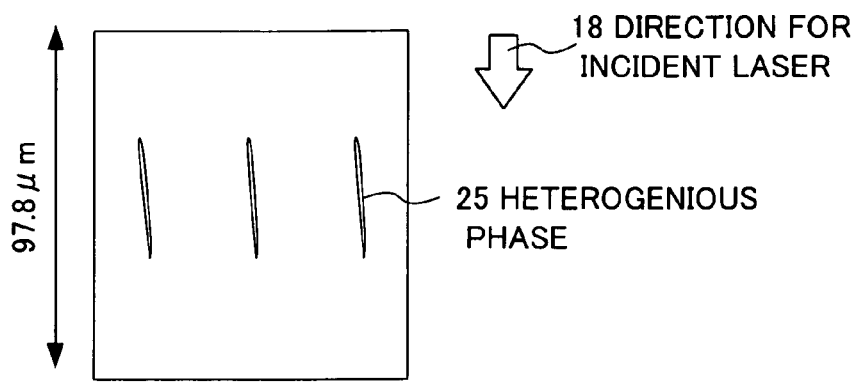
FIG. 5 is a view that exemplarily shows a cross-sectional shape of a heterogeneous phase in a base material that is formed using a method of forming a heterogeneous phase in accordance with one embodiment of the present invention.
Figure 5B:
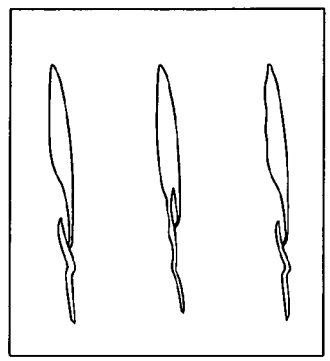
Figure 5C:
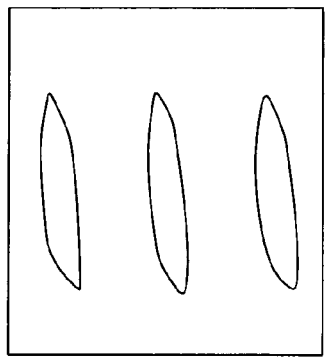
Figure 5D:
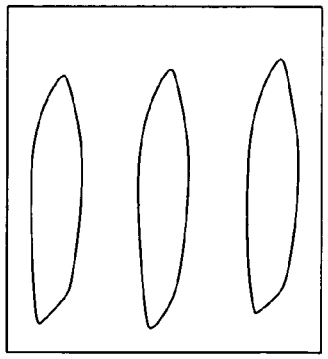

Alternatively, the heterogeneous phase 25 may be formed with a smaller irradiation output like the condition of the laser average output 120 mW shown in FIG. 5A and the sample position may be moved using the stage 50 etc. shown in FIG. 1. This can control the shape of the heterogeneous phase by forming and overlapping the plural heterogeneous phases 25 in the method of forming the heterogeneous phase in the present invention.

Example 4

Selection of Optical Material

FIG. 6 is a view that exemplarily shows a feature of properties of the base material in the method of forming the heterogeneous phase in accordance with one embodiment of the present invention. In the property 210 of refractive index versus Abbe number, the longitudinal axis indicates a refractive index ($n_d$) of the base material and the horizontal axis indicates an Abbe number ($v_d$) of the base material. FIG. 6 shows the plot of refractive index versus Abbe number of the respective materials of Samples A to L shown in Table 2.

The glass member of the present invention can be plotted on a two-dimensional coordinate of refractive index and Abbe number at an area where both of the refractive index ($n_d$) and the Abbe number ($v_d$) of the base material are smaller than the boundary 240 of materials. From the plot, the boundary 240 of preferable materials can be expressed by the following relation formula (I):

$$n_d < 2.32 - 0.013 v_d \quad (I)$$

wherein $n_d$ is a refractive index and $v_d$ is an Abbe number.

As described above, the glass able to be used in the present invention can be defined from the relation formula (I) not only from the viewpoint of composition. The refractive index and the Abbe number are an essential physical property in optical materials and can be applied to any optical materials as information of quality evaluation etc. The relation formula (I) can be used to judge previously and simply any optical materials as to whether or not the heterogeneous phase having the refractive index difference of no less than 0.005 can be formed. In other words, any optical materials can be conveniently judged previously as to whether or not the resulting heterogeneous phase has a similar property as that of Sample B, C, H, I or J.

Example 5

Example of Lens

Figure 7:
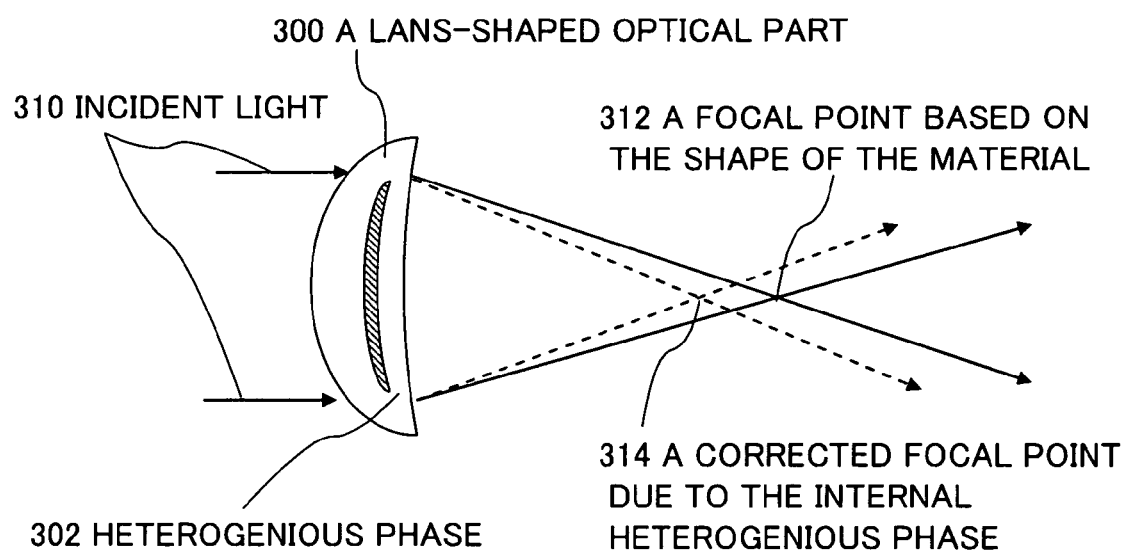
FIG. 7 is a conceptual diagram where a glass member for optical parts in accordance with one embodiment of the present invention is used as a lens.

FIG. 7 is a conceptual diagram where a glass member for optical parts in accordance with one embodiment of the present invention is used as a lens. In FIG. 7, the lens-shaped optical part 300 has the inside heterogeneous phase 302 thereby the focal point can be changed from that formed by the original lens shape.

Specifically, there can generate a focal point 314 that is corrected by the inside heterogeneous phase by way of providing the heterogeneous phase 302. The heterogeneous phase 302 may be periodic or random. The periodic alignment may be such that the heterogeneous phase has a concentric ring shape in which the ring width is periodically modified as a Fresnel lens. The alignment, rate, etc. of the heterogeneous phase 302 are design items in an optical part.

Example 6

Example of Diffraction Grating

Figure 8A:
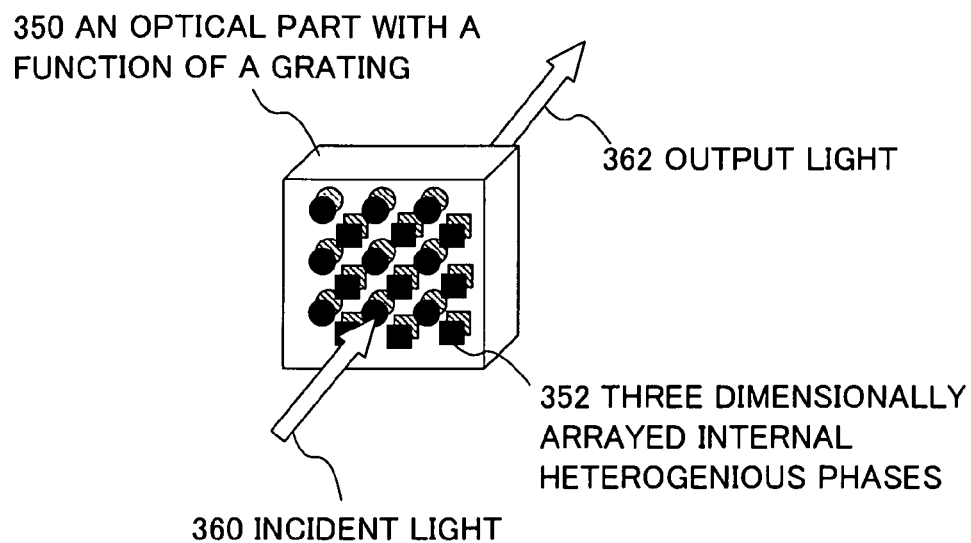
FIG. 8 is a conceptual diagram where a glass member for optical parts in accordance with one embodiment of the present invention is used as a diffraction grating.

FIG. 8 is a conceptual diagram where a glass member for optical parts in accordance with one embodiment of the present invention is used as a diffraction grating. In FIG. 8A, the optical part 350, which functions as a grating, has a heterogeneous phase 352 aligned three-dimensionally and periodically therein.

That is, the optical glass part, having the heterogeneous phase aligned three-dimensionally and periodically therein, can function as a grating, in the optical glass member processed by the method according to the present invention. Specifically, the output light 362, obtained by irradiating the incident light 360 to the optical part 350 that functions as a grating, contains a diffracted light.

Figure 8B:
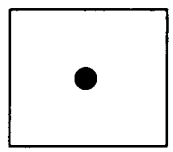

FIG. 8B is a conceptual diagram that represents an incident point light source 370. For example, the incident point light source 370 may be on a cross section of a partial light path, in the travelling direction, of the incident light 360 to the optical part 350 that functions as a grating.

Figure 8C:
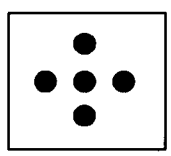

FIG. 8C is a conceptual diagram that represents an output point light source 380.

In one embodiment, the output point light source 380 can be obtained by irradiating the incident point light source 370 to the optical part 350 that functions as a grating according to the present invention. The cycle, size, etc. of the heterogeneous phase are design items, and intensity ratio or distribution of the diffracted light can be changed depending thereon.

The present invention is explained with respect to embodiments thereof as described above, but the technical scope of the present invention is not limited to the scope of the embodiments described above.

A variety of changes or improvements can be added to the embodiments described above. It is evident from the description of claims that the embodiments with the changes or improvements are included in the technical scope of the present invention. For example, similar reasoning can be applied to optical low-pass filters, various diffractive optical parts, optical diffusion parts, optical filters, lenses, optical parts relating to lenses, microlens arrays, etc.

I claim:

1. A glass member for optical parts, said glass member having a heterogeneous phase region therein that is distinguishable by a different refractive index, the glass member containing:
   25% to 75% of $SiO_2$,
   1% to 50% of $Rn_2O+RO$ and
   5% to 50% of $TiO_2$, as mass % based on oxides,
   where $Rn_2O$ is one or more selected from $Li_2O$, $Na_2O$, $K_2O$, $Rb_2O$ and $Cs_2O$, and RO is one or more selected from MgO, SrO, CaO, BaO and ZnO, wherein absolute value |Δn| of refractive index difference Δn of visual light is no less than 0.005 between base glass and said heterogeneous phase region in said glass member for optical parts, wherein said heterogeneous phase is not a cavity.

2. The glass member according to claim 1, wherein said heterogeneous phase region is formed by focused irradiation of a pulsed laser.

3. The glass member according to claim 1, wherein said glass member for optical parts contains 0% to 17% of $B_2O_3$ as mass % based on oxides.

4. The glass member according to claim 1, wherein said glass member for optical parts contains no more than 65% of $BaO+TiO_2$ as mass % based on oxides.

5. The glass member according to claim 1, wherein Abbe number ($v_d$) and refractive index ($n_d$) of said base glass are within a range to satisfy the formula (I), $$n_d < 2.32 - 0.013 v_d. \quad (I)$$

6. The glass member according to claim 2, said pulsed laser satisfies the following conditions (a) to (d):
(a) pulse width: 10 femtoseconds ($10 \times 10^{-15}$ second) to 10 picoseconds ($10 \times 10^{-12}$ second);
(b) repetition frequency: 10 Hz to 100 MHz;
(c) peak power density at focal point: 25 $GW/cm^2$ to 400 $TW/cm^2$; and
(d) focal point is movable by a scanning mechanism and scanning speed is 10 μm/sec to 10 mm/sec.

7. The glass member according to claim 1, wherein said heterogeneous phase region inside said glass member for optical parts is periodically or randomly formed in two- or three-dimensions.

8. The glass member according to claim 1, wherein said glass member for optical parts is used as an optical part selected from an optical low-pass filter, a diffractive optical part, a lens and a microlens array.

9. A method of producing the glass member according to claim 1, said method comprising irradiating a laser beam, satisfying the following conditions (a) to (d), and forming a heterogeneous phase region distinguishable by a different refractive index at an intended location inside a glass:
(a) pulse width: 10 femtoseconds ($10 \times 10^{-15}$ second) to 10 picoseconds ($10 \times 10^{-12}$ second);
(b) repetition frequency: 10 Hz to 100 MHz;
(c) peak power density at focal point: 25 $GW/cm^2$ to 400 $TW/cm^2$; and
(d) focal point is movable by a scanning mechanism and scanning speed is 10 μm/sec to 10 mm/sec.

10. A method of using a glass composition for optical parts, said method producing an optical part into which a heterogeneous phase region distinguishable by a different refractive index is formed at an intended location inside a glass by focused irradiation of a pulsed laser, in which the glass composition contains:
25% to 75% of $SiO_2$,
1% to 50% of $Rn_2O+RO$ and
0.9% to 50% of $TiO_2$, as mass % based on oxides,
where $Rn_2O$ is one or more selected from $Li_2O$, $Na_2O$, $K_2O$, $Rb_2O$ and $Cs_2O$, and RO is one or more selected from MgO, SrO, CaO, BaO and ZnO, and wherein absolute value |Δn| of refractive index difference Δn of visual light is no less than 0.005 between base glass and said heterogeneous phase region in said glass member for optical parts, wherein said heterogeneous phase is not a cavity.

* * * * *